United States Patent
Klopp

[15] 3,642,300
[45] Feb. 15, 1972

[54] BOMBLIFT TRAILER SUSPENSION SYSTEM

[72] Inventor: John H. Klopp, Baltimore, Md.

[73] Assignee: The United States of America as represented by the Secretary of the Air Force

[22] Filed: Nov. 26, 1969

[21] Appl. No.: 880,001

[52] U.S. Cl. ..................................280/34 A, 280/43.23
[51] Int. Cl. ...........................................B62d 21/18
[58] Field of Search ............280/43.23, 124.1, 43.22, 34 R, 280/34 A; 180/22 D

[56] References Cited

UNITED STATES PATENTS

| | | | |
|---|---|---|---|
| 2,728,583 | 12/1955 | Tucker | 280/43.22 |
| 2,936,034 | 5/1960 | Van Der Lely | 280/34 |
| 3,024,040 | 3/1962 | Muller | 280/124.1 |
| 3,024,041 | 3/1962 | Maruhn | 280/124.1 |
| 3,139,288 | 6/1964 | Peterson | 280/34.1 |
| 3,216,739 | 11/1965 | Drenter | 280/34 |

Primary Examiner—Leo Friaglia
Assistant Examiner—Robert R. Song
Attorney—Harry A. Herbert, Jr. and Arsen Tashjian

[57] ABSTRACT

A four-wheel bomblift trailer chassis having pivotally attached suspension arms arranged in a parallel linkage to support a vertically disposed kingpin and attached spindle. The rear suspension arms are arranged to pivot 90° around a point near each rear corner of the chassis and the wheels are pivotal around each respective kingpin. A hydraulic strut serves to stabilize the parallel linkage so that the chassis is supported. The chassis can be lowered to the ground by metering fluid from the internal cylinder which extends the hydraulic strut and can be raised by pumping fluid back into the cylinder.

2 Claims, 2 Drawing Figures

PATENTED FEB 15 1972 3,642,300

INVENTOR.
JOHN H. KLOPP
BY Harry A. Herbert Jr.
Arsen Tashjian
ATTORNEYS

BOMBLIFT TRAILER SUSPENSION SYSTEM

BACKGROUND OF THE INVENTION

This invention relates to an improved suspension system for an unusually versatile weapons-handling trailer and, more particularly, the invention is concerned with providing a bomblift trailer suspension system which includes a hydraulic strut that permits the trailer chassis to be quickly and easily raised and lowered and pivotal linkage means which permits rotation of the wheels for sidewise movement and folding of the rear suspension assemblies for reducing the effective trailer width.

Strict limitations are placed on weapons-handling trailer design because of the unique features of various military aircraft with which the trailer must be compatible. Many potential problem areas necessitate a thorough investigation into the various requirements for providing the ideal weapons trailer.

Some of these design problems are concerned with loading particular aircraft and include one aircraft where the inboard pylon is close to the landing wheel and the wheel-well cover in its open position may prevent vertical loading of the store into the pylon.

Other problems are concerned with aircraft having a bomb bay width of 20-inch maximum which limits the width of the lift mechanism and, since the bomb bay extends downward, the vertical height of the loader is also limited. Another type of aircraft has pylons so close to the ground that a 20-inch diameter store on the pylon leaves only 5 inches ground clearance. This is one of the worst cases for minimum ground clearance.

Another serious problem is the condition on an aircraft where the horizontal clearances between the rear of the outboard fuel tanks and the tip of the horizontal stabilizer and between the front of the inboard fuel tank and the nose fear are both unusually small. In this situation the bomblift trailer must be capable of getting under the fuselage to load a center store. Since the fuel tanks of military aircraft are always loaded first, it would be most desirable and necessary to have a trailer which can be lowered to ground level and one which can easily be moved laterally as well as being capable of being reduced in width so as to fit into tight areas.

SUMMARY OF THE INVENTION

The present invention provides a bomblift trailer suspension system wherein pivotally attached parallel suspension arms or links extend outwardly from each corner of the chassis. A vertically disposed kingpin with attached spindle is positioned between the outer ends of each pair of suspension links. These kingpins effectively permit rotation of the wheel and spindle around an axis perpendicular to the suspension links such that, when all four wheels are rotated 90°, the trailer is capable of sidewise or lateral movement.

Each of the rear suspension links of the trailer is further capable of folding by rearward rotation of the suspension arms around a pivot point on the corners of the chassis. In this latter mode and when the rear wheels have previously been rotated 90°, the resulting configuration produces a situation wherein the working part of the trailer is reduced to the width of the chassis along allowing operation in close quarters in the normal manner.

Another adjustment which adds to the adaptability of the trailer for use with the wide variety of aircraft and many different external stores, is the ability of trailer chassis to be lowered to the ground. This is accomplished by providing a hydraulic strut between the suspension arms. The strut serves to stabilize the linkage and support the chassis. The chassis can be raised and lowered by pumping fluid into and metering fluid out of the hydraulic strut. The lowering of the frame of the vehicle to ground level allows weapons to be placed on aircraft with low ground clearance.

Accordingly, it is an object of the invention to provide a trailer suspension system with the versatility and adaptability necessary to service a wide variety of aircraft with many different external stores.

Another object of the invention is to provide a bomblift trailer suspension system wherein the frame of the trailer can be quickly and easily lowered to ground level to allow weapons to be placed on aircraft with low ground clearance.

Still another object of the invention is to provide a trailer suspension system wherein all four wheels of the trailer can be manually rotated 90° to permit the loaded trailer to be moved sideways in order to maneuver around landing gear and stores already secured to external pylons.

A further object of the invention is to provide a bomblift trailer suspension system wherein the effective width of the rear section of the trailer can be reduced to the width of the frame by folding and locking the rear suspension assemblies of the trailer aft of their normal trail position.

A still further object of the invention is to provide a bomblift trailer suspension system wherein a hydraulic strut is positioned between the suspension arms for stabilizing the suspension linkage and for raising and lowering the chassis. Shock absorber means are also attached to the hydraulic strut.

These and other objects, features and advantages will become more apparent after considering the description that follows taken in conjunction with the attached drawings wherein like numbers are used throughout to identify like elements.

DESCRIPTION OF A PREFERRED EMBODIMENT

Figure 1:
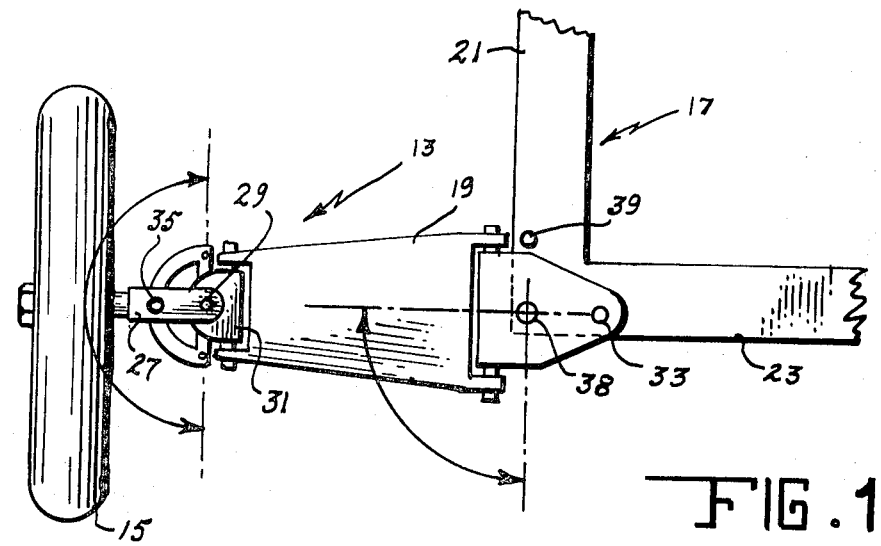
FIG. 1 is a top view of the bomblift trailer suspension system according to the invention with indications of the pivot capabilities of the elements.
Figure 2:
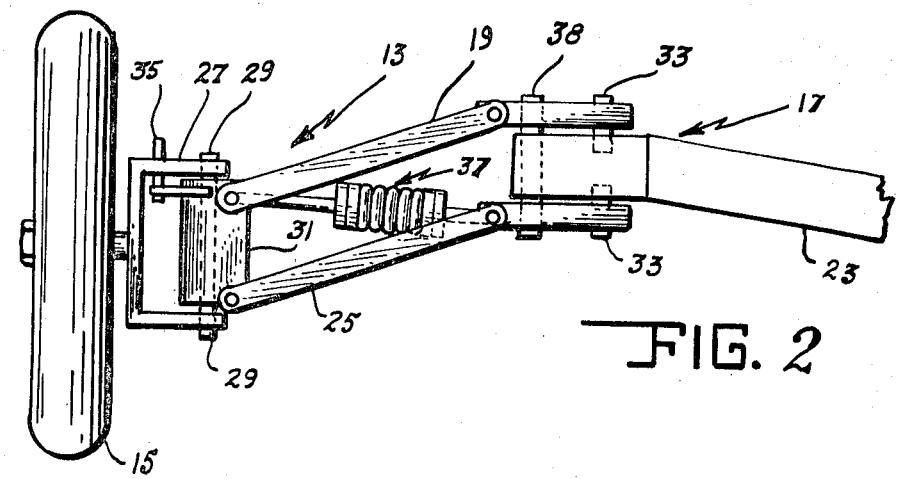
FIG. 2 is a side elevation view of the suspension system of FIG. 1 showing the combination hydraulic strut—shock absorber positioned between the suspension arms.

Referring now to the figures, there is shown a typical suspension system 13 for a bomblift trailer according to the invention. All four wheels 15 are independently suspended from the corners of the chassis 17. Except for pivoting and steering capabilities, the front and rear suspension systems are basically alike. In the drawings, the left rear suspension is shown, the right rear system being identical.

The suspension system includes a parallel linkage arrangement including an upper suspension arm 19 having its inner end pivotally attached to the upper surface of the corner of the chassis 17 where the longitudinal frame beam 21 and the lateral beam frame 23 are joined. Also pivotally attached to the chassis 17 but on the bottom surface directly below and parallel to the arm 19 is the lower suspension arm 25.

A spindle 27 is positioned in the area between the outer ends of the upper and lower suspension arms 19 and 25, respectively, by means of a kingpin 29 which allows the spindle 27 to pivot around an axis perpendicular to the ground. The outer ends of the upper and lower suspension arms are pivotally attached to the kingpin bracket 31 thereby providing the required capability of parallel movement of the arms. When the trailer is adjusted for movement in the normal forward or backward direction the chassis spring pins 33 are positioned in the manner shown in the drawings and the spindle spring pin 35 (which is found only on the suspension system on the rear wheels) is in the center position as shown.

A suspension cylinder 37, which is a hydraulic cylinder surrounded by resilient shock absorbing means, is positioned between the pivot points of the outer end of the upper suspension arm 19 and the inner end of the lower suspension arm 25. The action of the suspension cylinder 37 permits the trailer chassis 17 to be lowered and raised by changing the overall length of the cylinder 37. This is accomplished by actuating the cylinder 37 which becomes shorter in the frame-lift cycle and, when fully extended, the frame is lowered to the down position. Hence, the overall height of the trailer may be effectively reduced for passage under low-hanging pylons and bomb bay doors.

In addition, the hereinbefore described suspension system permits all four wheels to be rotated 90° about their kingpins 29 thereby allowing the trailer to be moved sideways for improved maneuverability around landing gear and other objects. The rear suspension arms can, in addition, be folded aft 90° thereby reducing the effective width of the rear section of the trailer to the width of the frame making the trailer even more maneuverable in close quarters.

MODE OF OPERATION

In operation, in normal trailer configuration, the chassis 17 is raised to trailing level by actuating suspension cylinder 37 either by manually pumping fluid into the cylinder or by attachment to an onboard hydraulic power pack. This procedure shortens the length of cylinder 37 and stabilizes the parallel linkage so that the chassis 17 is supported. The chassis 17 can be lowered to the ground by metering hydraulic fluid from the cylinder 37 thereby increasing the effective length of the hydraulic strut 37 and permitting the inner ends of the suspension arms 19 and 25 to rotate downward. A locking collar (not shown) may be positioned on the hydraulic strut 37 while in the raised position to prevent extension if the connecting hydraulic line is ruptured.

For lateral or sideways operation the front and rear wheels 15 are rotated about each of their respective kingpins 29 by releasing the spindle spring pins 35 and manually pivoting the wheels. The steering linkage (not shown) on the front wheels is first disconnected and after the wheels 15 are rotated, the spindle spring pin 35 is repositioned in the proper hole thereby locking the wheels in the rotated position. This configuration permits the trailer with the stores attached thereto to be wheeled sideways into position around landing gear and stores already secured to external pylons.

For work in close quarters, it may be necessary to reduce the width of the trailer. This can be accomplished by releasing the spring pins 33 on the rear suspension systems after the wheels 15 have been rotated 90° as noted above. Each of the rear suspension systems is then pivoted 90° rearward around the point 38 which brings the wheels 15 back into the forward-rearward trailing mode except that they are now reduced to a tracking width equaling the frame width. The pins 33 are then positioned in the holes 39 to lock the rotating parts in position. In this tracking mode the effective width of the rear section of the trailer is reduced to that of the frame thereby allowing the unit to be wheeled into many areas which would ordinarily be too narrow to receive the cradled stores.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use in other transfer and transport operations where mobility and maneuverability, as well as versatility, are primary requirements.

Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. In a weapons-carrying trailer having four wheels and a chassis, the improvement comprising a suspension system at each wheel of the trailer, each of said suspension systems including an upper suspension arm having its inner end pivotally attached to the upper surface of the chassis, a lower suspension arm having its inner end pivotally attached to the lower surface of the chassis, said upper and lower suspension arms being in parallel relationship, a wheel-holding spindle pivotally attached between the outer ends of said parallel suspension arms, a kingpin vertically disposed through said spindle to permit said spindle and wheel attached thereto to rotate therearound, pin means disposed on said spindle for locking and unlocking said spindle to permit rotation of the wheel 90° around said kingpin and allow sidewise movement of the weapons-carrying trailer, and variable length stabilizing means pivotally attached to said suspension system for controlled raising and lowering of the trailer chassis, said stabilizing means including a hydraulic strut positioned between the inner end of said lower suspension arm and the outer end of said upper suspension arm, the lengthening of said hydraulic strut causing the trailer chassis to be lowered to the ground and thereby permit the weapons-carrying trailer to be used for loading aircraft stores where conditions of minimum ground clearance exist.

2. The trailer suspension system defined in claim 1, wherein a pivot means is attached to the rear corners of the trailer chassis to permit each of said rear suspension systems to be rotated 90° causing said rear suspension systems to be folded backward and inward thereby effectively reducing the tracking width of the rear end of the trailer to that of the trailer chassis.

* * * * *